United States Patent
Han et al.

(10) Patent No.: US 9,892,307 B2
(45) Date of Patent: Feb. 13, 2018

(54) OPTICAL FINGERPRINT IMAGING SYSTEM AND OPTICAL ASSEMBLY THEREOF

(71) Applicant: Shanghai Oxi Technology Co., Ltd, Shanghai (CN)

(72) Inventors: Yong Han, Shanghai (CN); Hong Zhu, Shanghai (CN); Wei Fang, Shanghai (CN); Yan Ling, Shanghai (CN)

(73) Assignee: Shanghai Oxi Technology Co., Ltd, Shanghai (CN)

( * ) Notice: Subject to any disclaimer, the term of this patent is extended or adjusted under 35 U.S.C. 154(b) by 0 days.

(21) Appl. No.: 15/109,795

(22) PCT Filed: Aug. 7, 2015

(86) PCT No.: PCT/CN2015/086343
§ 371 (c)(1),
(2) Date: Jul. 5, 2016

(87) PCT Pub. No.: WO2017/024437
PCT Pub. Date: Feb. 16, 2017

(65) Prior Publication Data
US 2017/0235995 A1  Aug. 17, 2017

(51) Int. Cl.
*G06K 9/00* (2006.01)
*G06K 9/20* (2006.01)

(52) U.S. Cl.
CPC ......... *G06K 9/0004* (2013.01); *G06K 9/2027* (2013.01)

(58) Field of Classification Search
CPC ............ G06K 9/00006; G06K 9/00013; G02F 1/13338; H01L 27/14678
See application file for complete search history.

(56) References Cited

U.S. PATENT DOCUMENTS

| 6,011,860 A | 1/2000 | Fujieda |
| 2003/0103686 A1 | 6/2003 | Ogura |
| 2014/0205160 A1* | 7/2014 | Chang ............... H01L 27/14678 382/124 |

FOREIGN PATENT DOCUMENTS

| CN | 1424693 A | 6/2003 |
| CN | 103942559 A | 7/2014 |

(Continued)

OTHER PUBLICATIONS

International Search Report from PCT/CN2015/086343, dated Apr. 28, 2016.
Written Opinion from PCT/CN2015/086343, dated Apr. 28, 2016.

*Primary Examiner* — Wesley Tucker
(74) *Attorney, Agent, or Firm* — Swanson & Bratschun, L.L.C.

(57) ABSTRACT

An optical fingerprint imaging system and an optical assembly are provided. The optical fingerprint imaging system includes: a sensor including a substrate and a photosensitive layer, wherein the substrate has a first surface and a second surface which is opposite to and lower than the first surface, and the photosensitive layer is in contact with the first surface of the substrate; a light source disposed at a position lower than the first surface and higher than the second surface, and light emitted from the light source is adapted to be guided by the substrate of the sensor to the first surface of the substrate; and a mounting element adapted to mount the light source at a fixed position. Accordingly, the optical fingerprint imaging system has high light use efficiency and stable light source.

19 Claims, 4 Drawing Sheets

(56) References Cited

FOREIGN PATENT DOCUMENTS

| | | |
|---|---|---|
| CN | 104463107 A | 3/2015 |
| CN | 104700093 A | 6/2015 |
| WO | WO 2008/026169 | 3/2008 |

* cited by examiner

OPTICAL FINGERPRINT IMAGING SYSTEM AND OPTICAL ASSEMBLY THEREOF

RELATED APPLICATIONS

This application is a 35 U.S.C. § 371 national phase application of PCT/CN2015/086343, filed on Aug. 7, 2015, entitled "Optical Fingerprint Imaging System and Optical Assembly Thereof", the entire disclosure of which is incorporated herein by reference.

TECHNICAL FIELD

The present disclosure generally relates to optical imaging, and more particularly, to an optical fingerprint imaging system and an optical assembly thereof.

BACKGROUND

An optical fingerprint imaging system can implement fingerprint image capturing based on light reflection/refraction, and light sensing. Specifically, when a finger touches an active area of the optical fingerprint imaging system, light emitted from the fingerprint imaging system will reach the finger and be reflected by the finger. As light reflected by different regions, e.g., ridges and valleys of the finger may have different intensity values, features of a fingerprint corresponding to the finger can be represented based on the light intensities. In some solutions, the reflected light may be received by a sensor where the intensity information thereof is converted into electrical signals. As such, a fingerprint image can be obtained based on processing the electrical signals.

Generally, a backlight is required to provide light for implementing a fingerprint image capturing process. The backlight includes a light source (e.g. a LED) and a light guide plate, wherein the light source is disposed close to a lateral side of the light guide plate. Thus, light emitted from the light source can be guided, by the light guide plate, to the active area of the optical fingerprint imaging system. However, light use efficiency and a stability of the light source may affect an image capturing performance of the optical fingerprint imaging system.

Therefore, an optical fingerprint imaging system, which has improved light use efficiency and a stable light source, is required.

SUMMARY

According to one embodiment of the present disclosure, an optical fingerprint imaging system is provided. The optical fingerprint imaging system includes: a sensor including a substrate and a photosensitive layer, wherein the substrate has a first surface and a second surface which is opposite to and lower than the first surface, and the photosensitive layer is in contact with the first surface of the substrate; a light source disposed at a position lower than the first surface and higher than the second surface, and light emitted from the light source is adapted to be guided by the substrate of the sensor to the first surface of the substrate; and a mounting element adapted to mount the light source at a fixed position.

In some embodiments, the mounting element is adapted to fix the light source to a lateral side of the substrate.

In some embodiments, the mounting element includes a main body and a groove formed in the main body; wherein the main body is adapted to be fixed to the sensor with the groove thereon being disposed at the lateral side of the substrate; and wherein the groove in the main body is adapted to accommodate the light source therein, such that the light source is fixed to the lateral side of the substrate.

In some embodiments, the sensor has a protrusion and the main body of the mounting element has a concave corresponding to the protrusion, such that the main body is adapted to be fixed to the sensor by inserting the protrusion into the concave.

In some embodiments, the protrusion includes a read chip of the sensor.

In some embodiments, the mounting element includes a bracket adapted to fix the light source to a flexible printed circuit; and wherein the flexible printed circuit is adapted to be bonded to the sensor with the bracket thereon pressed against the lateral side of the substrate, such that the light source is fixed to the lateral side of the substrate.

In some embodiments, the mounting element is adapted to fix the light source in an end portion of the substrate.

In some embodiments, the mounting element includes a concave formed in the end portion of the substrate, and the groove is adapted to accommodate the light source therein.

In some embodiments, the concave has at least one opening configured on the first surface, the second surface, and a lateral side of the substrate.

In some embodiments, the optical fingerprint imaging system further includes a processor adapted to generate a fingerprint image based on electrical signals converted by the photosensitive layer of the sensor.

According to one embodiment of the present disclosure, an optical assembly for an optical fingerprint imaging system is provided. The optical assembly includes: a sensor including a substrate and a photosensitive layer, wherein the substrate has a first surface and a second surface which is opposite to and lower than the first surface, and the photosensitive layer is in contact with the first surface of the substrate; a light source disposed at a position lower than the first surface and higher than the second surface, and light emitted from the light source is adapted to be guided by the substrate of the sensor to the first surface of the substrate; and a mounting element adapted to mount the light source at a fixed position.

In some embodiments, the mounting element is adapted to fix the light source to a lateral side of the substrate.

In some embodiments, the mounting element includes a main body and a groove formed in the main body; wherein the main body is adapted to be fixed to the sensor with the groove thereon being disposed at the lateral side of the substrate; and wherein the groove in the main body is adapted to accommodate the light source therein, such that the light source is fixed to the lateral side of the substrate.

In some embodiments, the sensor has a protrusion and the main body of the mounting element has a concave corresponding to the protrusion, such that the main body is adapted to be fixed to the sensor by inserting the protrusion into the concave.

In some embodiments, the protrusion includes a read chip of the sensor.

In some embodiments, the mounting element includes a bracket adapted to fix the light source to a flexible printed circuit; and wherein the flexible printed circuit is adapted to be bonded to the sensor with the bracket thereon pressed against the lateral side of the substrate, such that the light source is fixed to the lateral side of the substrate.

In some embodiments, the mounting element is adapted to fix the light source in an end portion of the substrate.

In some embodiments, the mounting element includes a concave formed in the end portion of the substrate, and the groove is adapted to accommodate the light source therein.

In some embodiments, the concave has at least one opening configured on the first surface, the second surface, and a lateral side of the substrate.

Accordingly, in the optical fingerprint imaging system provided by the present disclosure, a mounting element is employed for fixing a light source to a lateral side of a substrate of a sensor, or disposing the light source in an end portion of the substrate of the sensor. Thus, there is substantially no gap between the light source and the substrate which serves as a light guide plate. Therefore, light emitted from the light source is able to enter into the substrate of the sensor directly. As such, use efficiency of the light is enhanced.

Furthermore, the light source is mounted at a fixed position, that is, there is no relative movement between the light source and the substrate of the sensor. Therefore, a stable light source is obtained. Accordingly, image capturing performance of the optical fingerprint imaging system is improved.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

In the optical fingerprint imaging system provided by the present disclosure, a mounting element is configured to fix a light source to a lateral side of a substrate or dispose the light source in an end portion of the substrate. Furthermore, the substrate serves both for forming a photosensitive layer thereon and guiding light emitted from the light source. In other words, a light guide plate, which is generally configured in an existing fingerprint imaging system, is replaced by the substrate of a sensor. Accordingly, a distance between the light source and the substrate of the sensor (a light guide plate) is reduced. By such, use efficiency of the light is improved.

In addition, the mounting element is adapted to mount the light source at a fixed position. Thus, a stable light source is achieved. Therefore, features (e.g. intensity, evenness, brightness, etc.) of the light reaching an active surface of the fingerprint imaging system may keep unchanged. Accordingly, performance of the optical fingerprint imaging system is enhanced.

Figure 1:
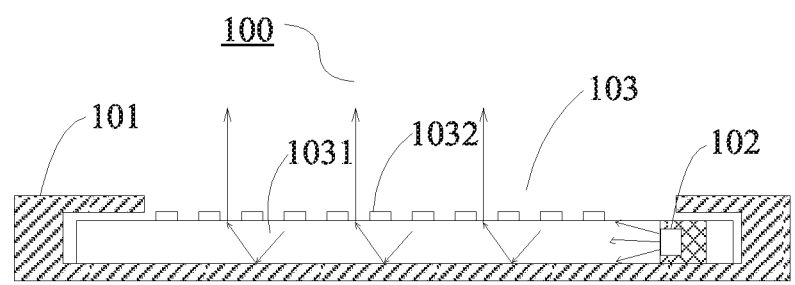
FIG. 1 schematically illustrates an optical fingerprint imaging system according to one embodiment of the present disclosure.

Referring to FIG. 1, an optical fingerprint imaging system 100 according to one embodiment of the present disclosure is illustrated. The optical fingerprint imaging system 100 includes: an optical assembly (not labeled in FIG. 1) adapted to implement a fingerprint image capturing process; and a shell 101 for accommodating the optical assembly.

The optical assembly includes: a light source 102 and a sensor 103. Furthermore, the sensor 103 includes a substrate 1031 and a photosensitive layer 1032. The substrate 1031 has a first surface and a second surface, wherein the second surface is located opposite to and lower than the first surface. The photosensitive layer 1032 is disposed on and in contact with the first surface of the substrate 1031. The light source 102 is disposed in an end portion of the substrate 1031 at a position lower than the first surface and higher than the second surface, and light emitted from the light source 102 is adapted to be guided by the substrate 1031 to the first surface of the substrate 1031 (indicated by arrow lines in FIG. 1). It should be noted that, in the present disclosure, higher and lower are measured with reference to an upmost surface of the optical fingerprint imaging system. When the optical fingerprint imaging system is in use, a finger is placed on the upmost surface. In the optical fingerprint imaging system, a position which is closer to the upmost surface is higher than other a position which is further from the upmost surface.

The photosensitive layer 1032 may be formed on the first surface of the substrate 1031 by a series of processes known in the art, such as film depositing, patterning, and etching. The substrate 1031 is made of transparent material, such as glass.

The optical assembly further includes a mounting element for fixedly and tightly disposing the light source 102 in an end portion of the substrate 1031, so as to mount the light source 102 at a fixed position. In other words, the light source is mounted at a fixed position located on the end portion of the substrate 1031. It should be noted that, the end portion of the substrate 1031 refers to a portion of the substrate 1031 close to a lateral side thereof.

Figure 2:
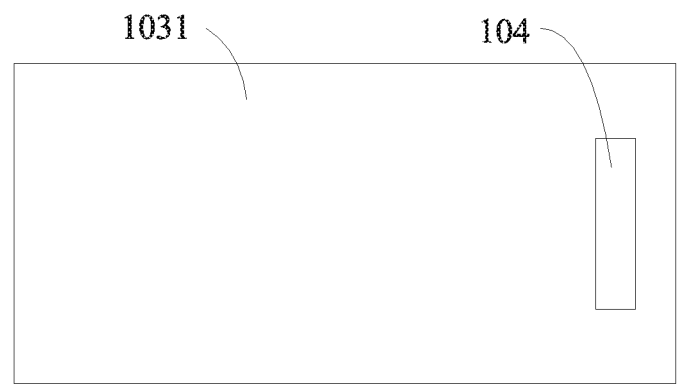
FIG. 2 schematically illustrates a top view of a substrate of an optical fingerprint imaging system according to a first embodiment of the present disclosure.

As shown in FIG. 2, in some embodiments of the present disclosure, the mounting element includes a concave 104. The concave 104 is formed in the end portion of the substrate 1031. The concave 104 is configured to accommodate the light source 102 therein, that is, the light source 102 is fixed in the concave 104 and there is no relative movement between the light source 102 and the substrate 1031. It should be noted that, when the light source 102 is tightly accommodated in the concave 104, there is substantially no gap between the light source 102 and an inner surface of the concave 104 which is formed in the substrate 1031. Thus, light emitted from the light source 102 is able to enter into the substrate 1031 of the sensor directly without multiple times of refraction. Therefore, use efficiency of the light is improved. In addition, there is no relative movement between the light source 102 and the substrate 1031. Therefore, stability of the light source is also improved.

Figure 3:
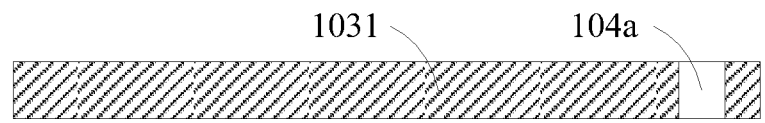
FIG. 3 schematically illustrates a cross sectional view of a substrate of an optical fingerprint imaging system according to the first embodiment of the present disclosure.

In some embodiments of the present disclosure, the concave is configured having two openings, as shown in FIG. 3 and labeled as 104*a*. Specifically, the concave 104*a* has a first opening on the first surface of the substrate 1031, and a second opening on the second surface of the substrate 1031. The first opening and the second opening communicate with each other. In other words, the concave 104*a* is configured into a through vias.

Figure 4:
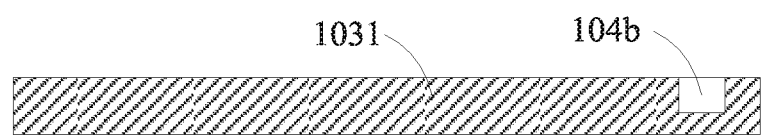
FIG. 4 schematically illustrates a cross sectional view of a substrate of an optical fingerprint imaging system according to a second embodiment of the present disclosure.

In some embodiments of the present disclosure, the concave is configured having one opening, as shown in FIG. 4 and labeled as 104*b*. Specifically, the concave 104*b* has a first opening on the first surface of the substrate 1031. In other words, the concave 104*b* is configured into a blind vias.

Figure 5:
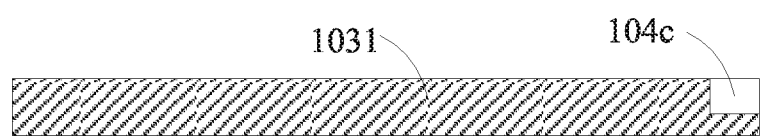
FIG. 5 schematically illustrates a cross sectional view of a substrate of an optical fingerprint imaging system according to a third embodiment of the present disclosure.

In some embodiments of the present disclosure, the concave is configured having two openings, as shown in FIG. 5 and labeled as 104*c*. Specifically, the concave 104*a* has a first opening on the first surface of the substrate 1031, and a third opening on the lateral side of the substrate 1031. The first opening and the third opening communicate with each other.

Figure 6:
FIG. 6 schematically illustrates a cross sectional view of a substrate of an optical fingerprint imaging system according to a fourth embodiment of the present disclosure.

In some embodiments of the present disclosure, the concave is configured having three openings, as shown in FIG. 6 and labeled as 104*d*. Specifically, the concave 104*a* has a first opening on the first surface of the substrate 1031, a second opening on the second surface of the substrate 1031, and a third opening on the lateral side of the substrate 1031. The first opening, the second opening, and the third opening communicate with each other.

In some embodiments, the optical fingerprint imaging system further includes a processor (not shown). The processor is configured to generate a fingerprint image based on electrical signals converted by the photosensitive layer 1032 of the sensor 103.

Figure 7:
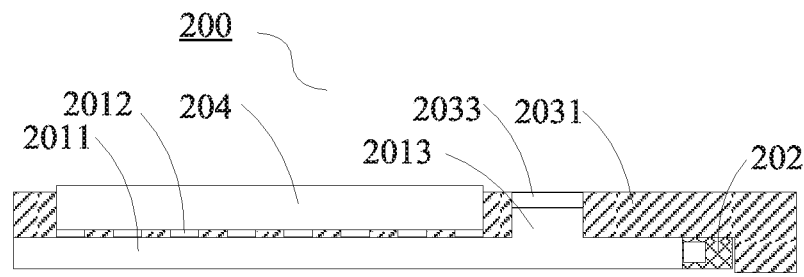
FIG. 7 schematically illustrates a cross sectional view of an optical assembly for an optical fingerprint imaging system according to one embodiment of the present disclosure.
Figure 8:
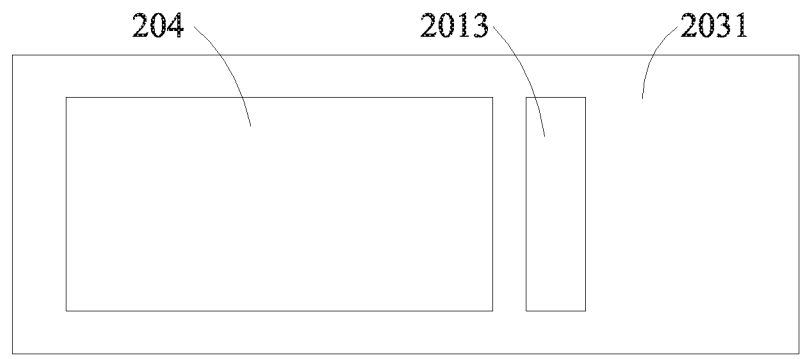
FIG. 8 schematically illustrates a top view of the optical assembly in FIG. 7.
Figure 9:
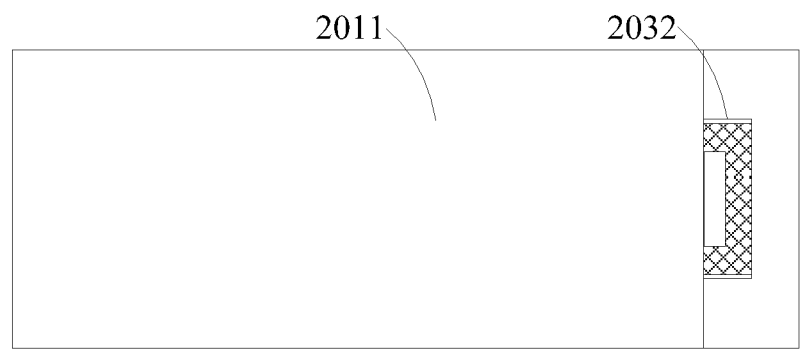
FIG. 9 schematically illustrates a bottom view of the optical assembly in FIG. 7.

Referring to FIG. 7 to FIG. 9, an optical assembly according to another embodiment of the present disclosure is illustrated. The optical assembly includes a sensor and a light source 202. The sensor includes a substrate 2011 and a photosensitive layer 2012 disposed on and in contact with a first surface of the substrate 2011. The light source 202 is attached to a lateral side of the substrate 2011 by a mounting element.

As shown, the mounting element includes a main body 2031 and groove 2032 formed in the main body 2031. The light source 202 is able to be tightly accommodated in the groove 2032. The mounting element further includes a concave 2033, and the sensor further includes a protrusion 2013, wherein the protrusion 2013 can be inserted into the concave 2033, so as to fix the mounting element to the sensor. As a relative position between the light source 202 and the mounting element is fixed, and a relative position between the mounting element and the sensor is fixed, a relative position between the light source 202 and the sensor. In other words, there is no relative movement between the light source 202 and the substrate 2011 of the sensor which serves as a light guide plate of the optical assembly. Accordingly, stability of the light source 202 is improved.

In some embodiments of the present disclosure, a read chip of the sensor serves as the protrusion 2013.

Furthermore, the mounting element is configured to: when the mounting element is fixed to the sensor, the light source 202 accommodated in the groove 2032 is disposed at the lateral side of the substrate 2011 of the sensor. In other words, there is substantially no gap between the light source 202 and the lateral side of the substrate 2011. Thus, light emitted from the light source 202 is able to enter into the substrate 2011 of the sensor directly. Therefore, use efficiency of the light is enhanced. It should be noted that, in some embodiments of the present disclosure, the groove 2032 on the main body 2031 and the lateral side of the substrate 2012 define a distance inbetween. In other words, the light source 202 is not disposed in contact with, but distanced from, the lateral side of the substrate 2012. In this case, the main body 2031 of the mounting element is nonopaque.

In addition, the optical assembly further includes a cover plate 204 disposed in contact with the photosensitive layer 2012 of the sensor. The cover plate 204 is employed to protect the photosensitive layer 2012, and a fingerprint image of a finger on the cover plate 204 can be obtained by the optical assembly. The mounting element further includes a groove (not labeled in FIG. 7) for accommodating the cover plate 204 therein.

In some embodiments, the main body 2031 of the mounting element may be configured into other shapes. Further, the mounting body 2031 may be bonded to the sensor by way of: glue bonding, buckling, or adhesive.

Figure 10:
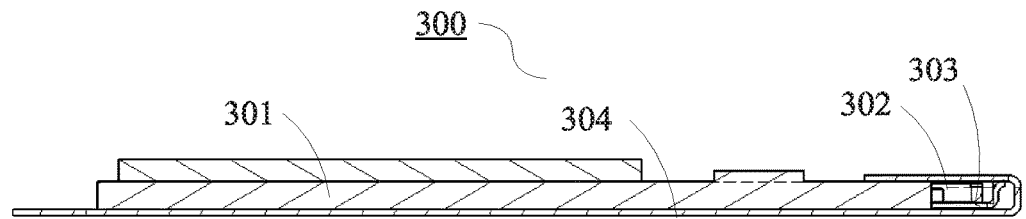
FIG. 10 schematically illustrates a cross sectional view of an optical assembly for an optical fingerprint imaging system according to another embodiment of the present disclosure.
Figure 11:
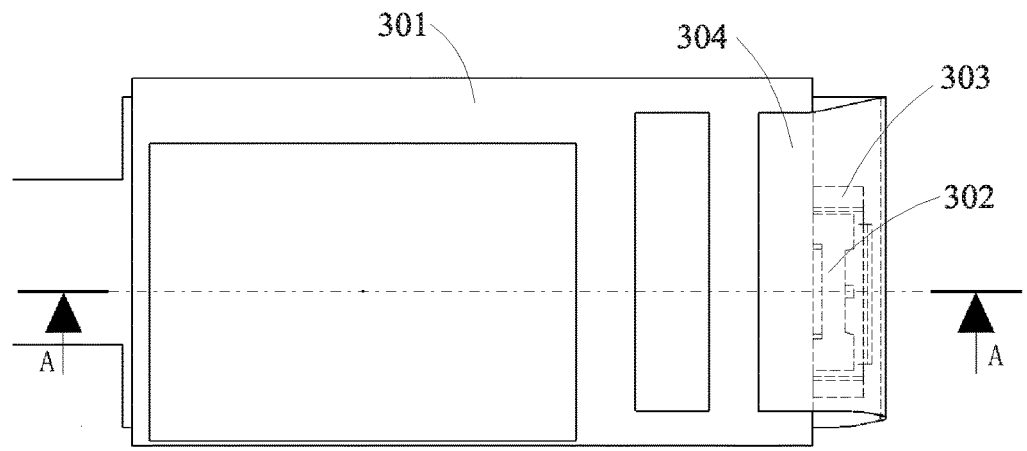
FIG. 11 schematically illustrates a top view of the optical assembly in FIG. 10.
Figure 12:
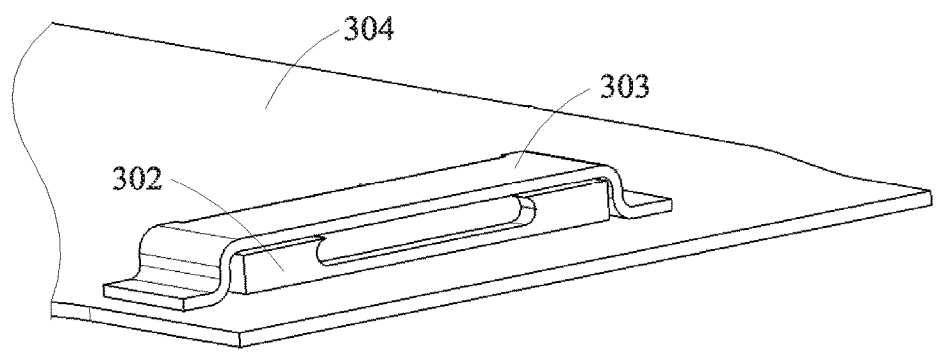
FIG. 12 schematically illustrates a graphic view of the optical assembly in FIG. 10.

Referring to FIG. 10 to FIG. 12, an optical assembly 300 according to another embodiment of the present disclosure is illustrated. The optical assembly 300 includes a sensor 301 and a light source 302. The sensor 301 includes a substrate and a photosensitive layer (not shown) disposed on and in contact with a first surface of the substrate. The light source 302 is attached to a lateral side of the sensor 301 by a mounting element.

The mounting element is configured into a bracket 303. The bracket 303 is configured to fix the light source 302 to a flexible printed circuit (FPC) 304 of the optical assembly 300. Specifically, the light source 302 is accommodated in a chamber (not labeled in FIG. 10 to FIG. 12) formed by the bracket 303 and the FPC 304. Furthermore, the FPC 304 is bonded to the sensor 301 with the bracket 303 thereon pressed against the lateral side of the sensor 301. As such, the light source 302 is disposed at a position close to the lateral side of the sensor 301. The bracket 303 can be configured to: when the FPC 304 is bonded to the sensor 301, the light source 302 is disposed at a position where substantially no gap is defined between the light source 302 and the lateral side of the sensor 301. Thus, light emitted from the light source 302 is able to enter into the sensor 301 (specifically, the substrate of the sensor 301) directly. Therefore, use efficiency of the light is enhanced.

In addition, the bracket 303 is made of rigid material, thus the light source 302 is adapted to be mounted, by the bracket 303, at a fixed position. Accordingly, stability of the light source 302 is improved.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. An optical fingerprint imaging system, comprising:
   a sensor comprising a substrate and a photosensitive layer, wherein the substrate has a first surface and a second surface which is opposite to and lower than the first surface, and the photosensitive layer is in contact with the first surface of the substrate;
   a light source disposed at a position in an end portion of the substrate lower than the first surface and higher than the second surface, and light emitted from the light source is adapted to be guided by the substrate of the sensor to the first surface of the substrate; and
   a mounting element adapted to mount the light source at a fixed position.

2. The optical fingerprint imaging system according to claim 1, wherein the mounting element is adapted to fix the light source to a lateral side of the substrate.

3. An optical fingerprint imaging system, comprising:
   a sensor comprising a substrate and a photosensitive layer, wherein the substrate has a first surface and a second surface which is opposite to and lower than the first surface, and the photosensitive layer is in contact with the first surface of the substrate;
   a light source disposed at a position lower than the first surface and higher than the second surface, and light emitted from the light source is adapted to be guided by the substrate of the sensor to the first surface of the substrate; and
   a mounting element adapted to mount the light source at a fixed position, wherein the mounting element comprises a main body and a groove formed in the main body, wherein the main body is adapted to be fixed to the sensor with the groove thereon being disposed at the lateral side of the substrate, and wherein the groove in the main body is adapted to accommodate the light source therein, such that the light source is fixed to the lateral side of the substrate.

4. An optical fingerprint imaging system, comprising:
   a sensor comprising a substrate and a photosensitive layer, wherein the substrate has a first surface and a second surface which is opposite to and lower than the first surface, and the photosensitive layer is in contact with the first surface of the substrate;
   a light source disposed at a position lower than the first surface and higher than the second surface, and light emitted from the light source is adapted to be guided by the substrate of the sensor to the first surface of the substrate; and
   a mounting element adapted to mount the light source at a fixed position, wherein the mounting element comprises a main body, and wherein the sensor has a protrusion and the main body of the mounting element has a concave corresponding to the protrusion, such that the main body is adapted to be fixed to the sensor by inserting the protrusion into the concave.

5. An optical fingerprint imaging system, comprising:
   a sensor comprising a substrate and a photosensitive layer, wherein the substrate has a first surface and a second surface which is opposite to and lower than the first surface, and the photosensitive layer is in contact with the first surface of the substrate;
   a light source disposed at a position lower than the first surface and higher than the second surface, and light emitted from the light source is adapted to be guided by the substrate of the sensor to the first surface of the substrate; and
   a mounting element adapted to mount the light source at a fixed position,
   wherein the sensor has a protrusion, and wherein the protrusion comprises a read chip of the sensor.

6. The optical fingerprint imaging system according to claim 2, wherein the mounting element comprises a bracket adapted to fix the light source to a flexible printed circuit; and wherein the flexible printed circuit is adapted to be bonded to the sensor with the bracket thereon pressed against the lateral side of the substrate, such that the light source is fixed to the lateral side of the substrate.

7. The optical fingerprint imaging system according to claim 1, wherein the mounting element is adapted to fix the light source in an end portion of the substrate.

8. The optical fingerprint imaging system according to claim 7, wherein the mounting element comprises a concave formed in the end portion of the substrate, and the concave is adapted to accommodate the light source therein.

9. The optical fingerprint imaging system according to claim 8, wherein the concave has at least one opening configured on the first surface, the second surface, and a lateral side of the substrate.

10. The optical fingerprint imaging system according to claim 1, further comprising a processor adapted to generate a fingerprint image based on electrical signals converted by the photosensitive layer of the sensor.

11. An optical assembly for an optical fingerprint imaging system, comprising:
    a sensor comprising a substrate and a photosensitive layer, wherein the substrate has a first surface and a second surface which is opposite to and lower than the first surface, and the photosensitive layer is in contact with the first surface of the substrate;
    a light source disposed at a position in an end portion of the substrate lower than the first surface and higher than the second surface, and light emitted from the light source is adapted to be guided by the substrate of the sensor to the first surface of the substrate; and
    a mounting element adapted to mount the light source at a fixed position.

12. The optical assembly according to claim 11, wherein the mounting element is adapted to fix the light source to a lateral side of the substrate.

13. An optical assembly for an optical fingerprint imaging system, comprising:
    a sensor comprising a substrate and a photosensitive layer, wherein the substrate has a first surface and a second surface which is opposite to and lower than the first surface, and the photosensitive layer is in contact with the first surface of the substrate;
    a light source disposed at a position lower than the first surface and higher than the second surface, and light emitted from the light source is adapted to be guided by the substrate of the sensor to the first surface of the substrate; and
    a mounting element adapted to mount the light source at a fixed position, wherein the mounting element comprises a main body and a groove formed in the main body, wherein the main body is adapted to be fixed to the sensor with the groove thereon being disposed at the lateral side of the substrate, and wherein the groove in the main body is adapted to accommodate the light source therein, such that the light source is fixed to the lateral side of the substrate.

14. An optical assembly for an optical fingerprint imaging system, comprising:

a sensor comprising a substrate and a photosensitive layer, wherein the substrate has a first surface and a second surface which is opposite to and lower than the first surface, and the photosensitive layer is in contact with the first surface of the substrate;

a light source disposed at a position lower than the first surface and higher than the second surface, and light emitted from the light source is adapted to be guided by the substrate of the sensor to the first surface of the substrate; and a mounting element adapted to mount the light source at a fixed position, wherein the mounting element comprises a main body, and wherein the sensor has a protrusion and the main body of the mounting element has a concave corresponding to the protrusion, such that the main body is adapted to be fixed to the sensor by inserting the protrusion into the concave.

15. An optical assembly for an optical fingerprint imaging system, comprising:

a sensor comprising a substrate and a photosensitive layer, wherein the substrate has a first surface and a second surface which is opposite to and lower than the first surface, and the photosensitive layer is in contact with the first surface of the substrate;

a light source disposed at a position lower than the first surface and higher than the second surface, and light emitted from the light source is adapted to be guided by the substrate of the sensor to the first surface of the substrate; and a mounting element adapted to mount the light source at a fixed position, wherein the sensor has a protrusion, and wherein the protrusion comprises a read chip of the sensor.

16. The optical assembly according to claim 12, wherein the mounting element comprises a bracket adapted to fix the light source to a flexible printed circuit; and wherein the flexible printed circuit is adapted to be bonded to the sensor with the bracket thereon pressed against the lateral side of the substrate, such that the light source is fixed to the lateral side of the substrate.

17. The optical assembly according to claim 11, wherein the mounting element is adapted to fix the light source in an end portion of the substrate.

18. The optical assembly according to claim 17, wherein the mounting element comprises a concave formed in the end portion of the substrate, and the concave is adapted to accommodate the light source therein.

19. The optical assembly according to claim 18, wherein the concave has at least one opening configured on the first surface, the second surface, and a lateral side of the substrate.

* * * * *